US012606963B2

(12) United States Patent
Pope, Jr.

(10) Patent No.: US 12,606,963 B2
(45) Date of Patent: Apr. 21, 2026

(54) POWERED VEHICLE COMBINING DUST COLLECTION, OVERLAY MIXING AND SPREADING

(71) Applicant: Refuse Materials, Inc., Ocilla, GA (US)

(72) Inventor: Donald A. Pope, Jr., Ocilla, GA (US)

(*) Notice: Subject to any disclaimer, the term of this patent is extended or adjusted under 35 U.S.C. 154(b) by 897 days.

(21) Appl. No.: 17/896,869

(22) Filed: Aug. 26, 2022

(65) Prior Publication Data

US 2023/0064531 A1 Mar. 2, 2023

Related U.S. Application Data

(60) Provisional application No. 63/237,969, filed on Aug. 27, 2021.

(51) Int. Cl.
*E01C 7/14* (2006.01)
*B01D 46/00* (2022.01)
(Continued)

(52) U.S. Cl.
CPC .......... *E01C 7/147* (2013.01); *B01D 46/0043* (2013.01); *B28C 5/4213* (2013.01);
(Continued)

(58) Field of Classification Search
CPC ....... B28C 5/06; B28C 5/0875; B28C 7/0418; B28C 7/163; B28C 5/1215; B28C 7/0413; B28C 5/0893; B28C 5/1238; B28C 5/16; B28C 7/02; B28C 5/08; B28C 5/0806; B28C 5/1253; B28C 5/4213; B28C 5/4248; B28C 5/4265; B28C 5/4289;

B28C 5/464; B28C 7/064; B28C 5/4203; E04G 21/025; E04G 21/0436; E04G 21/10; B01F 5/0473; B01F 5/048; B01F 5/0611; B01F 5/0618; B01F 2005/0091; B01F 2005/0636; B01F 25/3141; B01F 25/31423; B01F 25/4311; B01F 25/4316; B01F 25/431971;
(Continued)

(56) References Cited

U.S. PATENT DOCUMENTS 3,967,815 A * 7/1976 Backus ..................... B28C 9/00
366/141
5,017,016 A * 5/1991 Nasu ........................ B09B 3/35
366/139
(Continued)

*Primary Examiner* — Charles Cooley
(74) *Attorney, Agent, or Firm* — Fishman Stewart PLLC

(57) ABSTRACT

A concrete/cement resurfacing machine integrates a dust collection subsystem and an overlay mixing/distribution subsystem, enabling a single operator to steer the machine to a desired floor location and deposit mixed, cementitious overlay material. The combination of dust collection and overlay mixing saves considerable time and achieves improved results, eliminating the need for separate vacuum machines while reducing the risk that dust will be released as bags of dry ingredients are added to the mixing tank. A single propane engine powers a hydraulic pump, with fluid being routed to three separate hydraulic motors with associated control valves to provide for forward/reverse locomotion, bidirectional paddle mixing, and vacuum generation. The dust collection system is preferably a two-stage system including a vacuum collection tank and a HEPA filter.

16 Claims, 2 Drawing Sheets

(51) Int. Cl.
| | |
|---|---|
| *B28C 5/42* | (2006.01) |
| *B60P 3/16* | (2006.01) |
| *B62B 3/00* | (2006.01) |
| *B62B 5/00* | (2006.01) |
| *E01C 19/46* | (2006.01) |

(52) U.S. Cl.
    CPC .......... *B28C 5/4248* (2013.01); *B28C 5/4265* (2013.01); *B28C 5/4289* (2013.01); *B60P 3/16* (2013.01); *B62B 3/001* (2013.01); *B62B 5/003* (2013.01); *E01C 19/46* (2013.01); *B62B 2202/00* (2013.01)

(58) Field of Classification Search
    CPC ...................... B01F 2025/931; B01F 35/2202; B01F 23/53; B01F 2035/99; B01F 35/00; B01F 35/20; B01F 35/2111; B28B 1/16; C04B 2111/00146; C04B 40/0028; E04F 21/24; E04F 15/12; E04F 21/08; E04F 21/248; E04F 21/02; B29C 67/242; E01C 7/147; E01C 19/46; B01D 46/0043; B60P 3/16; B62B 3/001; B62B 5/003; B62B 2202/00
    USPC .......................................................... 366/11
    See application file for complete search history.

(56) References Cited

U.S. PATENT DOCUMENTS

| | | | | |
|---|---|---|---|---|
| 6,273,513 | B1 * | 8/2001 | Pope | E04G 23/006 |
| | | | | 15/93.1 |
| 6,783,743 | B1 * | 8/2004 | Starner | B01F 35/189 |
| | | | | 366/156.1 |
| 9,738,461 | B2 * | 8/2017 | DeGaray | B28C 7/0038 |
| 11,203,002 | B1 * | 12/2021 | Lanclos | B01F 27/70 |
| 2007/0226089 | A1 * | 9/2007 | DeGaray | G06Q 10/087 |
| | | | | 705/28 |
| 2010/0201181 | A1 * | 8/2010 | Pope | E04G 23/006 |
| | | | | 299/37.1 |
| 2013/0199617 | A1 * | 8/2013 | Degaray | B28C 7/0038 |
| | | | | 137/1 |
| 2017/0369258 | A1 * | 12/2017 | Degaray | B28C 9/0454 |
| 2018/0347214 | A1 * | 12/2018 | Degaray | B28C 7/044 |
| 2020/0288933 | A1 * | 9/2020 | Pope | A47L 11/085 |
| 2020/0406500 | A1 * | 12/2020 | Pope | B28C 5/1253 |
| 2022/0403672 | A1 * | 12/2022 | Pope, Jr. | E04G 23/0203 |
| 2022/0410433 | A1 * | 12/2022 | Pope, Jr. | B62B 3/00 |
| 2023/0000296 | A1 * | 1/2023 | Pope, Jr. | B28D 7/02 |
| 2023/0032463 | A1 * | 2/2023 | Pope, Jr. | B24B 7/186 |
| 2023/0064531 | A1 * | 3/2023 | Pope, Jr. | B28C 5/4213 |
| 2023/0067358 | A1 * | 3/2023 | Pope, Jr. | B24B 27/0007 |

* cited by examiner

POWERED VEHICLE COMBINING DUST COLLECTION, OVERLAY MIXING AND SPREADING

REFERENCE TO RELATED APPLICATIONS

This application claims priority to, and the benefit of, U.S. Provisional Patent Application Ser. No. 63/237,969, filed Aug. 27, 2021, the entire content of which is incorporated herein by reference.

FIELD OF THE INVENTION

This invention relates generally to hard floor resurfacing and, in particular, to a mobile cart that combines dust collection with overlay mixing and spreading.

BACKGROUND OF THE INVENTION

Polished concrete floors are becoming increasingly popular for retailers, big-box stores, educational and medical facilities, and even residential applications. Common uses include warehouses and warehouse outlets, hotels and restaurants, office buildings and showrooms. Benefits include low cost, resistance to wear, low maintenance, and aesthetic appeal in many situations. Polished concrete floors are easy to clean, and the glossy surface of polished concrete resists the marks of forklift truck tires and staining from oil and chemical spills. The glossy appearance of polished concrete is desirable for office building, hotels, restaurants, and other public facilities that want to project a bright, clean, professional image.

Various different types of machines are used to achieve a polished concrete floor, including riding and walk-behind coarse and fine grinders and polishers using wet and dry techniques. Machines are also available for stripping and removing old floors, filling, in cracks, applying concrete overlays, as well as slurry and dust collection. In applying an overlay, a floor is typically prepped to provide better adherence of the new cementitious layer. Such preparation may include applying a layer of epoxy or other sealer, followed by a sand-containing base. New cementitious material is then mixed on site, distributed and spread over the prepped base, usually to achieve a thickness in the range of ⅜ to ½ inches.

While there are overlay mixers on the market, existing machines are deficient in several respects. The first is capacity. Existing mixers for floor overlays are small, walk-behind units that can only accommodate 3-5 bags of dry material at a time. This wastes times by requiring repeated reloading and remixing several times for a big job. Secondly, and as important, under strict environmental and safety rules, it is imperative that airborne dust be collected as each bag of dry material is emptied into the mixing chamber. The plume of dust generated contains silica particles, which is particularly harmful in windless, indoor environments. While some overlay mixers have provisions for dust evacuation, these provisions are limited to ports adapted for connection to a separate dust collector that must be carried around with the mixer device.

There is an outstanding need for a higher capacity, more efficient overlay mixer for cement/concrete floor applications.

SUMMARY OF THE INVENTION

This invention increases the efficiency of cement/concrete floor resurfacing by providing an overlay mixer that integrates multiple operations into a single vehicle. The machine is self-powered, rideable, and includes a high-capacity mixing chamber that readily accommodates 18 bags of dry material, up to a maximum of 21 bags. In addition to overlay mixing and spreading/distribution apparatus on the same frame, the vehicle further integrates a vacuum producer and dust collection subsystem, enabling the mixing chamber to be safely refilled without having to carry around (and power) a separate dust collection machine, as in now the case. Once loaded, a single operator can steer the machine to a desired floor location and deposit the mixed overlay material in a controlled manner for spreading and leveling by other workers in a time-saving manner.

A high-capacity overlay mixer adapted to cement/concrete floor resurfacing operations comprises a vehicle with front and rear wheels and a platform to receive an operator. A motor and steering mechanism enables the operator to move the vehicle to desired locations on a floor surface. A mixing tank mounted on the frame includes an upper hatch to receive wet and dry ingredients. An agitator such as a paddle agitator is provided for mixing the wet and dry overlay materials once added to the mixing tank, and a chute disposed under the mixing tank is provided for discharging the mixture onto a floor surface for distribution and spreading. A vacuum producer mounted on the frame, includes an input proximate to the opening of the mixing tank to automatically suction dust generated as dry materials are added to the tank. A dust filtration and collection system mounted on the frame receive dust suctioned by the vacuum producer for storage and removal.

In the preferred embodiments, the motor used to move the vehicle comprises a first hydraulic motor coupled to a hydraulic pump driven by an internal combustion engine. The first hydraulic motor may be reversable through an associated control valve, enabling the operator to move the vehicle in forward and reverse directions. The agitator may be powered by a second hydraulic motor coupled to the hydraulic pump through an agitator control valve that may enable the operator to control the agitator in forward and reverse directions. The vacuum producer may be powered by a third hydraulic motor, also coupled to the same hydraulic pump, but through a separate vacuum control valve.

The dust filtration and collection system is preferably a two-stage system including a vacuum collection tank and a HEPA filter, and the chute is preferably extensible and rotatable to reach desired floor areas. The mixing tank may have the capacity to receive 18 or more bags of dry material added to an appropriate amount of water present in the mixing tank. For weight distribution, the operator platform may be in a mid-section of the frame, between the propane engine and pump mounted on one end of the frame and the mixing tank and duct collection system mounted on an opposing end of the frame.

DETAILED DESCRIPTION OF THE INVENTION

As discussed in the Background of the Invention, to resurface an uneven or damaged floor, the process of concrete floor refinishing may dictate the application of new material; i.e., an overlay. Currently, overlay material is mixed with a pull-behind concrete/mortar mixer and spread manually onto the floor surface. Once the overlay has cured, it may be ground and polished to achieve a desired finish. Dust collection is mandatory during overlay mixing, since a plume of concrete dust is generated as the dry ingredients are mixed with water. Current practice dictates the use of a separate dust extractor, which is inconvenient, requiring separate transportation and power requirements.

This invention improves upon existing overlay application processes by providing a ride-on vehicle that combines overlay mixing and dust collection. The vehicle includes an extensible, rotatable chute from the mixing tank, enabling the mixed overlay material to be deposited onto a floor surface as an operator travels to floor areas requiring resurfacing.

Figure 1:
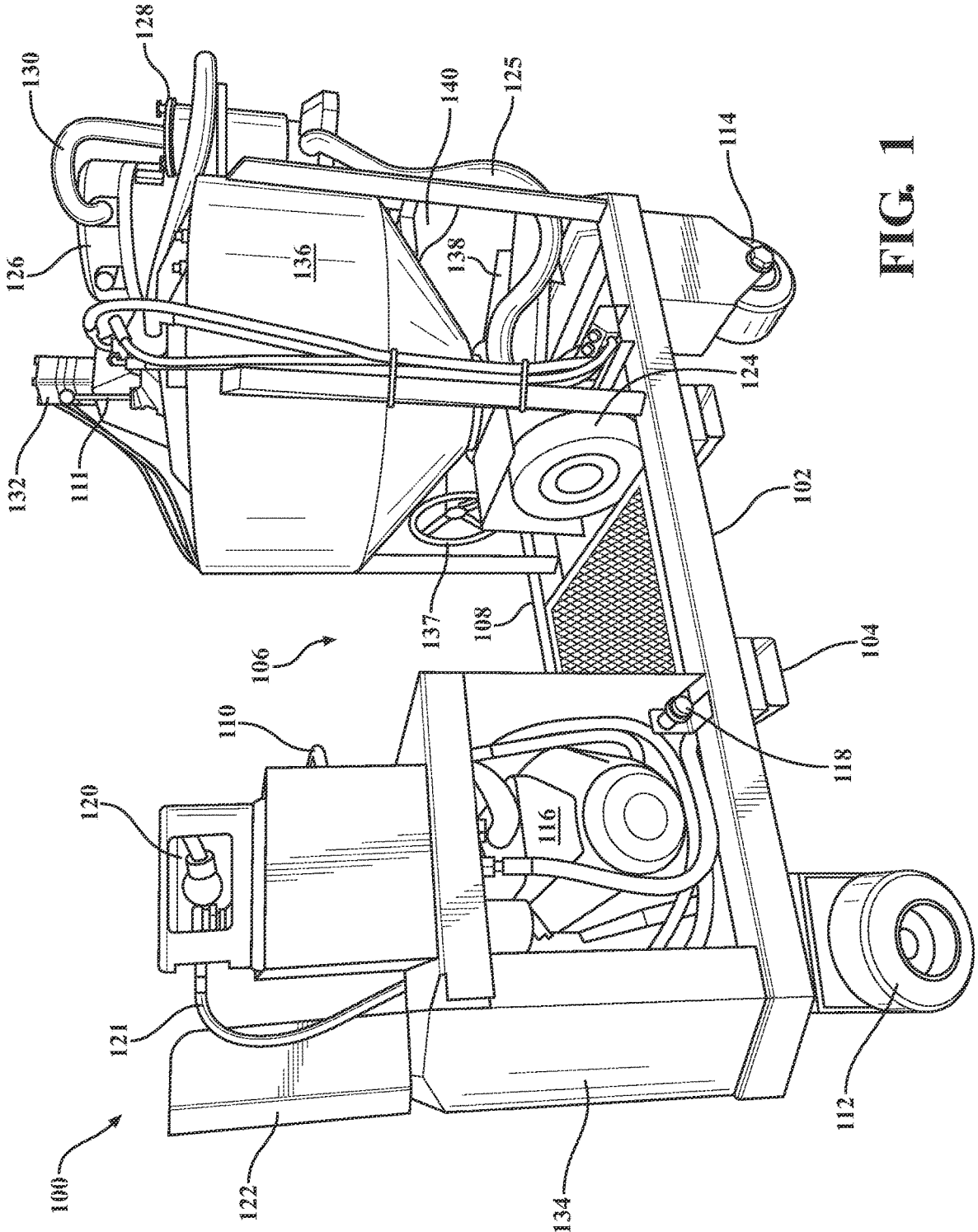
FIG. 1 is a first side view of a preferred embodiment of the invention.
Figure 2:
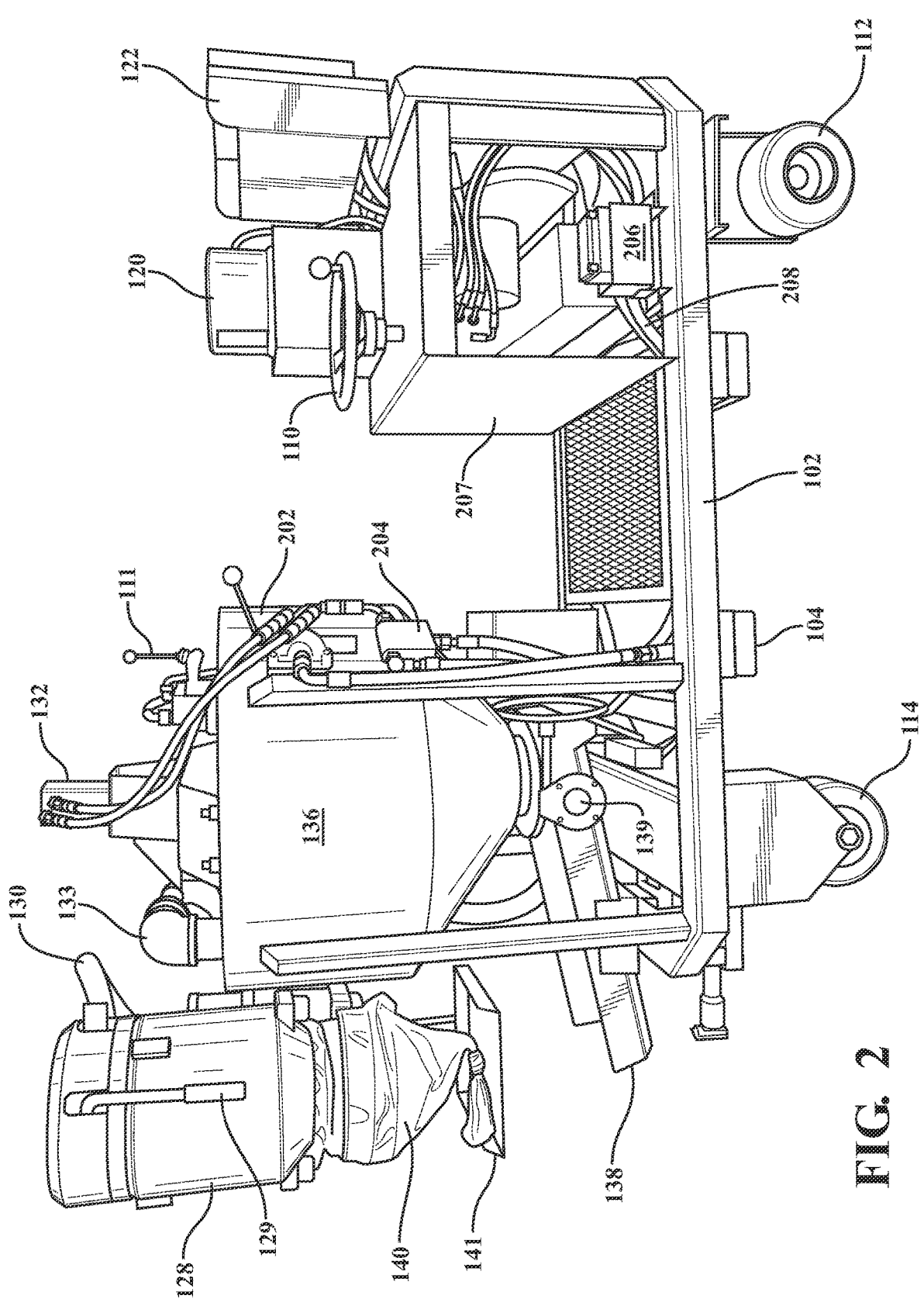
FIG. 2 is an opposing side view of the preferred embodiment.

FIG. 1 is a first side view of the apparatus, and FIG. 2 shows an opposing side. The apparatus takes the form of a powered vehicle 100 including a first end portion housing a motor 116 and hydraulic pump, and an opposing end portion including dust collection and overlay mixing components. The motor 116 is coupled directly to the hydraulic pump, which is not visible in the figures and it is behind a metal shield to protect from heat generation.

Frame 102 including wheels 112, 114 and optional fork-lift slots 104. An operator stands in region 106 on platform 108 between the forward and rear end portions of the frame. Wheels 114 are considered the front and wheels 112 are considered the rear wheels. The rear wheels are powered and steered using steering wheel 110 seen in FIG. 2.

Motor 116 is preferably a propane engine fed by tank 120 through high-pressure fuel line 121. Hydraulic fluid is contained in tank 134, and housing 122 contains an auxiliary hydraulic oil cooler and fan.

Engine housing 207 further includes a battery 206, and other unlabeled components such as a starter motor, alternator, and catalytic muffler. The output of the hydraulic pump is split off to three separate hydraulic motors controlling different functions through separate control valves. One of the hydraulic motors propels the vehicle itself through lines 208 using control valve 111; a second hydraulic motor 132 controlled by valve 202 is coupled to an agitator (not visible) in mixing tank 136; and a third hydraulic motor (not visible) controls vacuum producer 124 through control valve 204.

In the preferred embodiment, the agitator includes rotatable blades; however, the invention is not limited in terms of blade design, and the term "blade" should be taken to include paddles, impellers, shaped rods, and so forth. The control valves associated with the first and second hydraulic motors also preferably facilitate reverse fluid flow, enabling forward/reverse vehicle movement and clockwise/counterclockwise paddle rotation.

Vehicle speed is controlled by throttle 118, and forward/reverse may be selected with control lever 111. The throttle control 118 is normally operated in a wide-open position but may be operated in other positions to change engine R.P.M. which also changes the hydraulic speeds. Vehicle speed, however, is controlled through lever/valve 111, the more it is pushed, the faster the machine goes, and vice versa. It basically functions as a variable speed control valve.

The overlay mixing system includes mixing tank 136, the contents of which are mixed and agitated with an internal set of blades driven by hydraulic motor 132. Tank 136 is loaded via an opening on the top, measuring approximately 12"× 24", facing the operator on platform 108, enabling the operator to cut or break bags and let the dry overlay material into the tank 136. Not pictured in FIG. 2 is a chute that sits under chute 138, extending the chute outwardly while providing 180 degrees of articulation for easier spreading of the material. The bracket for the chute extension is shown in FIG. 2 underneath 138. This machine chute design looks very similar to those found on larger conventional concrete mixer trucks seen on the road.

The upper surface of mixing tank 136 includes a removable door enabling a user to pour the contents of dry overlay material through the door and into a premeasured amount of liquid, typically water. The preferred door size is on the order of 12" by 24", more or less. A mesh screen may remain in place when the door is removed to keep user's hands from entering into the mixing tank 136 which is typically in a state of agitation when the dry ingredients are added.

The dust collection system includes the vacuum producer 124 controlled by control valve 204. The vacuum producer provides suction to a two-stage filtration system including vacuum tank 128, followed by a HEPA filter coupled to vacuum tank 126 via hose 130. The contents of tank 126 is emptied into collection bag(s) 140 upon activation of dump handle 129. Platform 141 helps to hold bag 140 as it becomes full. HEPA filter is recharged with a new canister when appropriate.

Dust is collected as dry ingredients are poured through hose/connection 133, which allows the vacuum system remove the air borne dust from inside the tank 136, thus minimizing the escape of harmful dust. Hose 125 in FIG. 1 is the connection from the vacuum producer to the HEPA filter which is in turn connected to the main filters and tank.

In operation, a predetermined amount of liquid is added to the mixing tank. An operator activates the agitator and the vacuum producer, and begins pouring bags of dry mixture into the open door of the tank through the mesh screen. Pipe 133 automatically suctions dust generated in the tank. The user may reverse the agitator if clumping is seen in the tank. When the last bag is emptied, the door is closed and vacuum system may be turned off. The agitator is typically left operating as the vehicle drive is engaged to move over a desired floor area.

Mixed overlay material is released from tank 136 through sheet chute 138 using tank valve driven by wheel 137. Gate valve 139, controlled by hand wheel 137, also provides a variable flow based on how wide or narrow it is opened using hand wheel 137. The floor to be covered may be wetted with water to enhance adherence, and one or more workers may be employed to spread the overlay material with squeegees, trowels, and so forth.

The invention is not limited in terms of the precise formulation of the overlay material, which may be concrete or other cementitious material, with or without aggregate(s). The invention provides significant time savings, since the same machine, with the same operator, may simply "switch" from dust-free overlay mixing to overlay distribution.

The invention claimed is:

1. A high-capacity overlay mixer adapted to cement/concrete floor resurfacing operations, comprising:
   a vehicle comprising a frame with front and rear wheels and a platform to receive an operator;
   a motor and steering mechanism enabling the operator to move the vehicle to desired locations on a floor surface;
   a mixing tank mounted on the frame to receive and mix overlay material, the mixing tank having an upper, closable opening to receive wet and dry overlay materials;
   an agitator for mixing the wet and dry overlay materials once added to the mixing tank;

a chute disposed under the mixing tank for discharging the mixture onto a floor surface for distribution and spreading;

a vacuum producer mounted on the frame, the vacuum producer having an input proximate to the opening of the mixing tank to automatically suction dust generated as dry materials are added to the mixing tank;

a dust filtration and collection system mounted on the frame to receive dust suctioned by the vacuum producer;

wherein the motor used to move the vehicle comprises a first hydraulic motor coupled to a hydraulic pump driven by an internal combustion engine; and wherein the vacuum producer is powered by a second hydraulic motor coupled to the hydraulic pump through a vacuum control valve.

2. The overlay mixer of claim 1, wherein the first hydraulic motor is reversable through a control valve, enabling the operator to move the vehicle in forward and reverse directions.

3. The overlay mixer of claim 1, wherein the agitator is powered by a third hydraulic motor coupled to the hydraulic pump through an agitator control valve.

4. The overlay mixer of claim 3, wherein the agitator control valve is reversible, enabling the operator to control the agitator in forward and reverse directions.

5. The overlay mixer of claim 1, wherein the dust filtration and collection system is a two-stage system including a vacuum collection tank and a HEPA filter.

6. The overlay mixer of claim 1, wherein the chute is extensible and rotatable to reach desired floor areas.

7. The overlay mixer of claim 1, wherein the mixing tank has the capacity to receive 18 or more bags of dry material added to an appropriate amount of water present in the mixing tank.

8. The overlay mixer of claim 1, wherein the platform is in a mid-section of the frame, between the motor mounted on one end of the frame and the mixing tank and the dust filtration and collection system mounted on an opposing end of the frame.

9. A high-capacity overlay mixer adapted to cement/concrete floor resurfacing operations, comprising:

a vehicle comprising a frame with front and rear wheels and a platform to receive an operator;

a mixing tank mounted on the frame to receive and mix overlay material, the tank having an upper, closable opening to receive wet and dry overlay materials, an agitator for mixing the wet and dry overlay materials once added to the mixing tank, and a chute disposed under the mixing tank for discharging the mixture onto a floor surface for distribution and spreading;

a vacuum producer mounted on the frame, the vacuum producer having an input proximate to the opening of the mixing tank to automatically suction dust generated as dry materials are added to the tank;

a dust filtration and collection system mounted on the frame to receive dust suctioned by the vacuum producer;

an engine driving a hydraulic pump coupled to a plurality of hydraulic motors through separate control valves all mounted on the frame, including a first hydraulic motor used to power the wheels and move the vehicle to desired locations on a floor surface, a second hydraulic motor used to power the agitator, and a third hydraulic motor used to power the vacuum producer.

10. The overlay mixer of claim 9, wherein the engine is a propane engine or other internal combustion engine.

11. The overlay mixer of claim 9, wherein the first hydraulic motor is reversable, enabling the operator to move the vehicle in forward and reverse directions using the associated control valve.

12. The overlay mixer of claim 9, wherein the second hydraulic motor is reversable, enabling the operator to rotate the agitator in forward and reverse directions using the associated control valve.

13. The overlay mixer of claim 9, wherein the dust filtration and collection system is a two-stage system including a vacuum collection tank and a HEPA filter.

14. The overlay mixer of claim 9, wherein the chute is extensible and rotatable to reach desired floor areas.

15. The overlay mixer of claim 9, wherein the mixing tank has the capacity to receive 18 or more bags of dry material added to an appropriate amount of water present in the mixing tank.

16. The overlay mixer of claim 9, wherein the platform is in a mid section of the frame, between the engine mounted on one end of the frame and the mixing tank and the dust filtration and duct-collection system mounted on an opposing end of the frame.

* * * * *